United States Patent [19]
Matyas, Jr. et al.

[11] Patent Number: 5,953,420
[45] Date of Patent: Sep. 14, 1999

[54] METHOD AND APPARATUS FOR ESTABLISHING AN AUTHENTICATED SHARED SECRET VALUE BETWEEN A PAIR OF USERS

[75] Inventors: Stephen Michael Matyas, Jr., Poughkeepsie, N.Y.; Donald Byron Johnson, Manassas, Va.

[73] Assignee: International Business Machines Corporation, Armonk, N.Y.

[21] Appl. No.: 08/736,774

[22] Filed: Oct. 25, 1996

[51] Int. Cl.[6] .................................. H04L 9/08; H04L 9/30
[52] U.S. Cl. .................................. 380/21; 380/9; 380/23; 380/25; 380/30; 380/44; 380/49
[58] Field of Search .................. 380/9, 21, 30, 380/49, 50, 59, 23, 25, 44, 46

[56] References Cited

U.S. PATENT DOCUMENTS

| | | |
|---|---|---|
| 4,200,770 | 4/1980 | Hellman et al. . |
| 4,424,414 | 1/1984 | Hellman et al. ............................ 380/30 |
| 4,956,863 | 9/1990 | Goss . |
| 5,115,467 | 5/1992 | Esserman et al. . |
| 5,199,070 | 3/1993 | Matsuzaki et al. . |
| 5,299,263 | 3/1994 | Beller et al. . |
| 5,345,506 | 9/1994 | Tsubakiyama et al. . |
| 5,406,628 | 4/1995 | Beller et al. . |
| 5,515,439 | 5/1996 | Bantz et al. ............................... 380/23 |
| 5,668,877 | 9/1997 | Aziz ........................................ 380/30 |

FOREIGN PATENT DOCUMENTS

| | | |
|---|---|---|
| 0658021 | 12/1993 | European Pat. Off. . |
| 2246639 | 10/1990 | Japan . |
| 2246640 | 10/1990 | Japan . |
| 9504416 | 2/1995 | WIPO . |
| 9508232 | 3/1995 | WIPO . |

OTHER PUBLICATIONS

"American National Standard X9.42—1996 Public Key Cryptography For The Financial Services Industry: Agreement Of Symmetric Algorithm Keys Using Diffie–Hellman" X9.42—Diffie–Hellman—Sep. 1996.

"New Directions in Cryptography" by W. Diffie & M. E. Hellman, IEEE Transactions On Information Theory, vol. IT–22, No. 6, Nov. 1976, pp. 644–654.

"A Key Distribution "Paradox"" by Yacov Yacobi, Crypto '90 Conference at the University of California, Aug. 11–15, 1990, pp. 267–273.

*Primary Examiner*—Bernarr E. Gregory
*Attorney, Agent, or Firm*—William A. Kinnaman, Jr.

[57] ABSTRACT

A method and apparatus for generating authenticated Diffie–Hellman keys. Each user first generates an authenticated first shared secret value from a first nonshared persistent secret value generated by that user and an authenticated first transformed value received from the other user over a trusted communications channel. Each user then dynamically generates a second shared secret value from a second nonshared secret value dynamically generated by that user and a dynamically generated second transformed value received from the other user. Each user thereafter generates one or more keys by concatenating the first and second shared secret values together with a count to form a concatenated value and passing the concatenated value through a one-way hash function to generate a hash value from which the keys are extracted. Since only the legitimate users possess the information necessary to construct the first shared secret value, a spoofer interacting with a user to generate a second shared secret value cannot generate the same key. Incrementing the count for successive hashes allows a multiplicity of keys to be generated from a given pair of shared secret values.

24 Claims, 5 Drawing Sheets

METHOD AND APPARATUS FOR ESTABLISHING AN AUTHENTICATED SHARED SECRET VALUE BETWEEN A PAIR OF USERS

BACKGROUND OF THE INVENTION

1. Field of the Invention

This invention relates to a method and apparatus for establishing an authenticated shared secret between a pair of users and, more particularly, to a method for generating a multiplicity of authenticated keys from a single statically generated, authenticated shared secret value.

2. Description of the Related Art

W. Diffie and M. E. Hellman describe, at page 649 of "New Directions in Cryptography", *IEEE Transactions on Information Theory*, vol. IT-22, no. 6, November 1976, pp. 644–654, as well as in U.S. Pat. No. 4,200,770, a protocol whereby a pair of conversers may establish a cryptographic key over an insecure communications channel subject to eavesdropping.

In accordance with the general form of the Diffie-Hellman key agreement protocol, each user generates a secret value X, which he keeps to himself, and from this generates a public value Y using a transformation that is infeasible to invert. One such transformation is $$Y = g^X \bmod p, \qquad (1)$$

where p is a large prime modulus and g is a generator over the Galois field GF(p). Regenerating X from Y generated in this manner amounts to determining the discrete logarithm of Y, which is considered to be a mathematically intractable problem. Each user transmits its own public value Y to the other user over a communications channel.

Each user then generates, from its own secret value X and the public value Y transmitted to it from the other user, a shared secret value Z that is infeasible to generate solely from the public values Y transmitted over the communications channel. Continuing the above example, one such transformation is $$Z = Y^X \bmod p, \qquad (2)$$

where p and g are defined as before.

Finally, one or more keys are derived by extracting bits from the shared secret value Z. Thus, to generate a series of n-bit keys, the most significant (i.e., leftmost) n bits of Z may be used to form a first key, the next most significant n bits of Z may be used to form a second key, and so on. (Alternatively, the extraction process may proceed from right to left.)

Since, by hypothesis, the transformation Y(X) is infeasible to invert, an eavesdropper on the communications channel cannot recover either of the secret values X from the public values Y transmitted over the channel. Further, since the shared secret value Z is infeasible to generate solely from the public values Y, an eavesdropper cannot generate Z (and hence the keys) by some other means, not using either of the secret values X.

Although the above protocol allows two parties to establish a private key between themselves over an insecure channel, it has some deficiencies. Directly taking portions of Z for a key has risks because of the possible presence of bias. For example, the high-order bit of Z tends to 0 for certain choices of p, as Z is the result of a modulo operation. Additionally, Z may have some structure that could be exploited by an attacker. Even if these weaknesses existed only for "bad" rare combinations of public values, they would still be undesirable.

Additionally, only a relatively small number of keys can be generated from a single exchange of public values Y, depending on the length of Z relative to the keys.

Finally, there is the problem of authentication, that is, how user A can be confident that he is communicating with user B and not, say, user C. There is nothing in the basic scheme that authenticates a public value Y as originating with a particular party. Thus, user A, believing that he has established a key with user B, may in fact have established the key with an impostor C.

Thus, some problems with the existing Diffie-Hellman protocol include (1) how to extract bits for a symmetric key from Z; (2) how to create a multiplicity symmetric keys; and (3) how to authenticate a key generated using the protocol.

SUMMARY OF THE INVENTION

In accordance with the present invention, the problem of how to extract bits for a symmetric key from the shared secret value Z is solved by passing Z through a one-way function. As Z is the size of the prime p, we do not need to take a risk of bias; we can use all the variability of Z if we pass it through a one-way function. That is, even if some of the bits have a bias or some structure exists, any such possible bias or structure is eliminated for all practical purposes once the large Z is passed through a oneway function to create a small symmetric key.

To solve the problem of creating many symmetric keys, Z is concatenated with a first value and passed through the one-way function to produce a first set of one or more keys, concatenated with a second value and passed through the oneway function to produce a second set of keys, and so on for as many keys are needed.

To solve the problem of user authentication, each user has two Diffie-Hellman public values Y: one (Y1) is static (i.e., long-term) and authenticated, preferably by being certified by a trusted third party; the other (Y2) is dynamic (i.e., short-term or ephemeral) and generated anew. The static certified public values Y1 are exchanged to produce a first shared secret value Z1, and the dynamic public values Y2 are exchanged to produce a second shared secret value Z2. The first and second shared secret values Z1 and Z2 are concatenated and the result passed through a one-way function to produce the symmetric key. An adversary cannot produce the first shared secret value Z1 and so cannot spoof the real users. The only other party that could produce both shared secret values Z1 and Z2 is the party with whom one desires to communicate.

The present invention scales in many different directions. If users do not want authentication, they just calculate Z2 and set Z1 to null. On the other hand, if users want authentication but not dynamic Diffie-Hellman keys, they just calculate Z1 and set Z2 to null. If the users want to create one key or many keys from Z, that is allowed, and the risk of creating multiple keys from Z is accepted by the users as appropriate for their solution.

DESCRIPTION OF THE PREFERRED EMBODIMENTS

Figure 1:
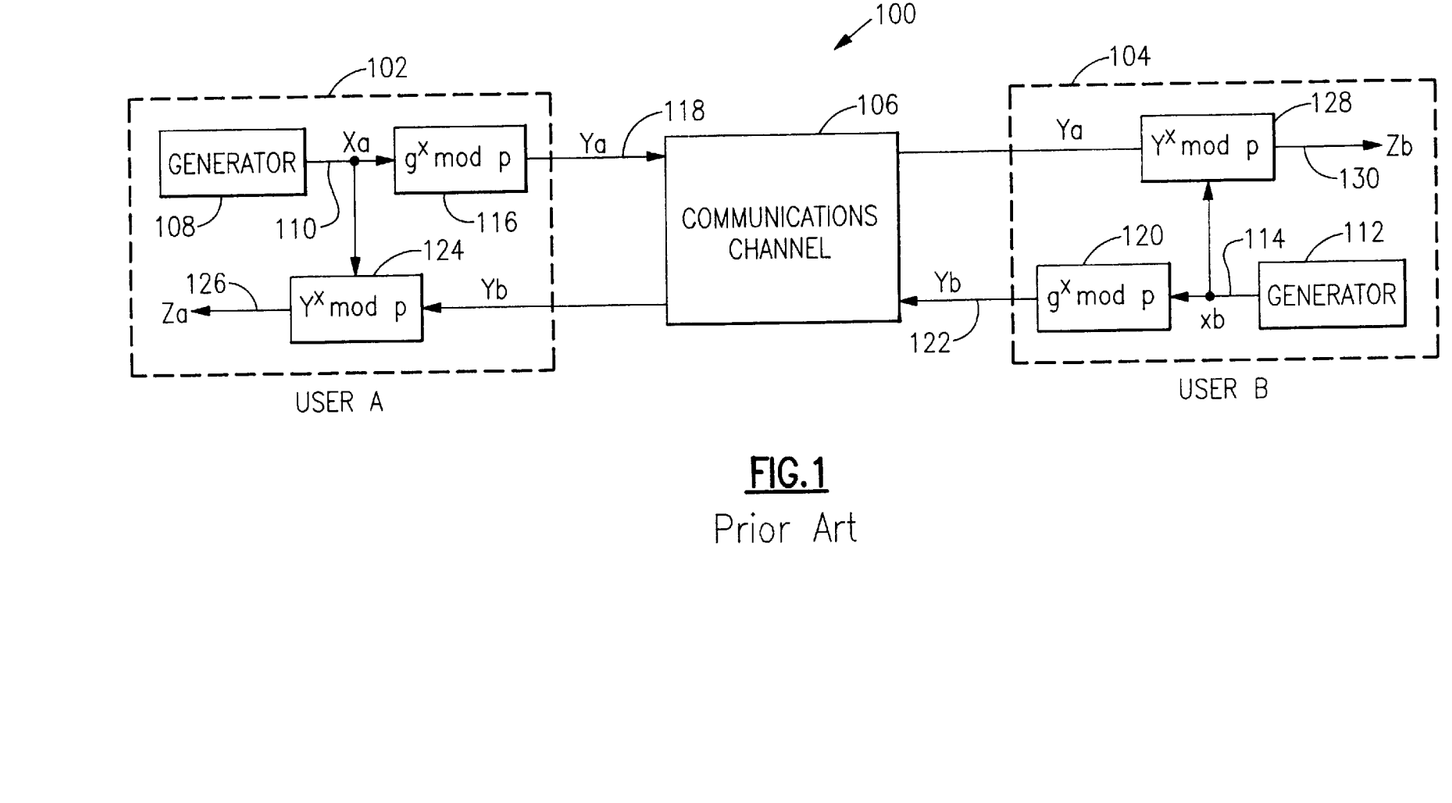
FIG. 1 is a schematic block diagram of a conventional Diffie-Hellman key agreement system.

FIG. 1 shows a conventional form of the Diffie-Hellman key agreement protocol as described, for example, at page 649 of W. Diffie and M. E. Hellman, "New Directions in Cryptography", *IEEE Transactions on Information Theory*, vol. IT-22, no. 6, November 1976, pp. 644–654, or in U.S. Pat. No. 4,200,770. The method is used in a communication system 100 in which a pair of users 102 (user A) and 104 (user B) are coupled by a communications channel 106.

In accordance with the general form of the Diffie-Hellman key agreement protocol, each user generates a secret value X, which he keeps to himself. Thus, user A generates (108) a secret value Xa (110), using a pseudorandom number generator or the like, while user B generates (112) a secret value Xb (110) in a similar manner.

Each user 102, 104 then generates from its secret value X a public value Y using a transformation that is infeasible to invert. One such transformation disclosed by the authors is the transformation $$Y = g^X \bmod p, \tag{1}$$

where p is a large prime modulus and g is a generator over the Galois field GF(p) consisting of the integers $\{0, 1, 2, \ldots, p-1\}$.

Thus, user A calculates (116) a public value Ya (118) as $$Ya = g^{Xa} \bmod p, \tag{1a}$$

while user B calculates (120) a public value Yb (122) as $$Yb = g^{Xb} \bmod p. \tag{1b}$$

Each user 102, 104 transmits its own public value Y to the other user over communications channel 106. Thus, user A sends Ya to user B, while user B sends Yb to user A.

Each user then generates, from its own secret value X and the public value Y transmitted to it from the other user, a common shared secret value Z that is infeasible to generate solely from the public values Y transmitted over the network. One such common shared secret value Z taught by Diffie et al. is the value $$Z = g^{(Xa \cdot Xb)} \bmod p, \tag{1c}$$

which is generated by each user as $$Z = Y^X \bmod p, \tag{2}$$

where X is the secret value generated by the user and Y is the public value received from the other user. Thus, user A generates (124) a value Za (126) as $$Za = Yb^{Xa} \bmod p, \tag{2a}$$

while user B generates (128) a value Zb (130) as $$Zb = Ya^{Xb} \bmod p, \tag{2b}$$

where Xa and Xb are the secret values and Ya and Yb are the public values generated by user A and user B, respectively.

It may be shown that Equations (2)–(2b) are equivalent and all yield the same value, that is:

$$Za = Zb = Z \tag{3}$$

Finally, each user generates a key by extracting some or all of the bits forming the value Z.

Since, by hypothesis, the transformation Y(X) is infeasible to invert, an eavesdropper on the communications channel 106 between users A and B cannot recover either of the secret values Xa and Xb from the public values transmitted over the channel. Further, since the value Z is infeasible to generate solely from the values Ya and Yb, an eavesdropper cannot generate Z by some other means, not using either of the secret values Xa and Xb.

As noted above, however, the generated value Z may be nonuniformly distributed so as to give a cryptanalyst an unintended headstart in determining the key. Also, the value Z can only be used to generate one or a small number of different keys, depending on the relative lengths of the key and Z. Finally, there is nothing in the basic procedure that authenticates a given public value Y as originating from a given user. Thus, user A, believing that he has established a secret key with user B, may have in fact established a key with an impostor masquerading as user B.

Figure 4:
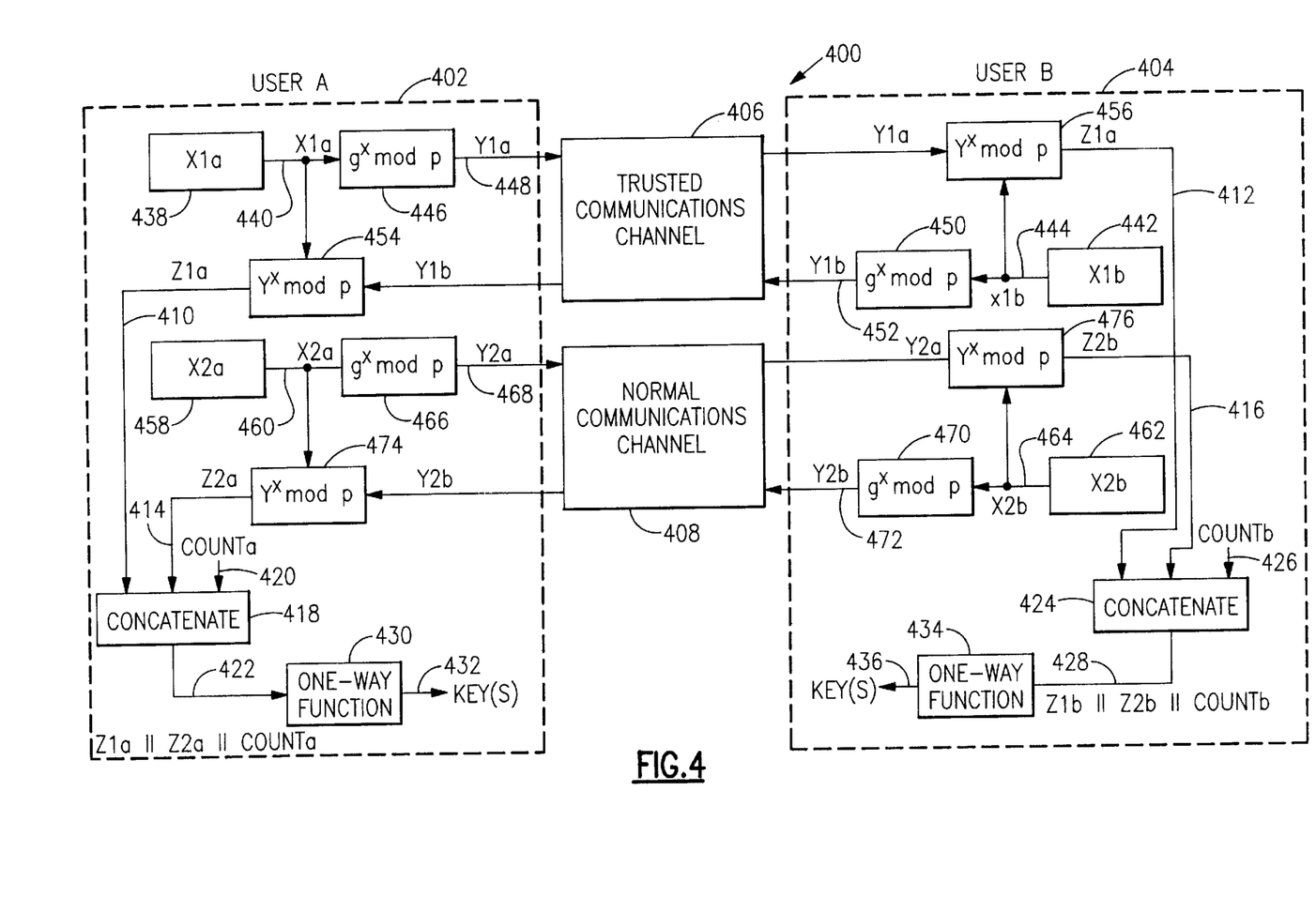
FIG. 4 is a schematic block diagram of the key agreement system of the present invention.

FIG. 4 shows the key agreement system 400 of the present invention. In the system 400 shown in FIG. 4, a pair of users or parties 402 (user A) and 404 (user B) are interconnected via a trusted communications channel 406 and a normal communications channel 408. Users 402 and 404 may comprise any suitable combination of hardware and/or software, such as programmable workstations. Although similar functions are shown separately in FIG. 4 to illustrate the data flow, in a software implementation they would typically be implemented as successive calls to a common routine, as determined by instructions contained on a machine-readable program storage device such as a magnetic disk or semiconductor read-only memory (ROM).

Trusted communications channel 406 is "trusted" in the sense that a user 102 or 104 receiving a message from the other user over that channel is assured that the message actually originates from that user and has not been altered; communications channel 406 may, but need not be, secure from interception by third parties to be "trusted" in this sense. As described below, trusted communications channel 406 is used to exchange the static public values that are used to assure the authenticity of the keys that are generated in accordance with the present invention.

Any suitable means (electronic communication, face-to-face meeting) may be used to implement the trusted communications channel 406. However, the preferred form of trusted communication channel 406 is a certification authority that issues certificates certifying the statically generated public values Y1 of the users 402 and 404. Each certificate would thus contain the identity of a user together with its public value Y1, and would be digitally signed with the private signature key of the certification authority to render it unforgeable.

Normal communications channel 408 is used for other communications between the parties 402 and 404, including the exchange of ephemeral (i.e., short-term or dynamic) public values Y2 and the encrypted messages that are later transmitted between the parties. If desired, trusted communications channel 406 could be used for all communications instead of providing a separate normal communications channel 408. However, the bandwidth of the trusted communications channel 406 will ordinarily be such that a faster albeit less "trusted" communications channel 408 will be preferable for normal communications.

Figure 5:
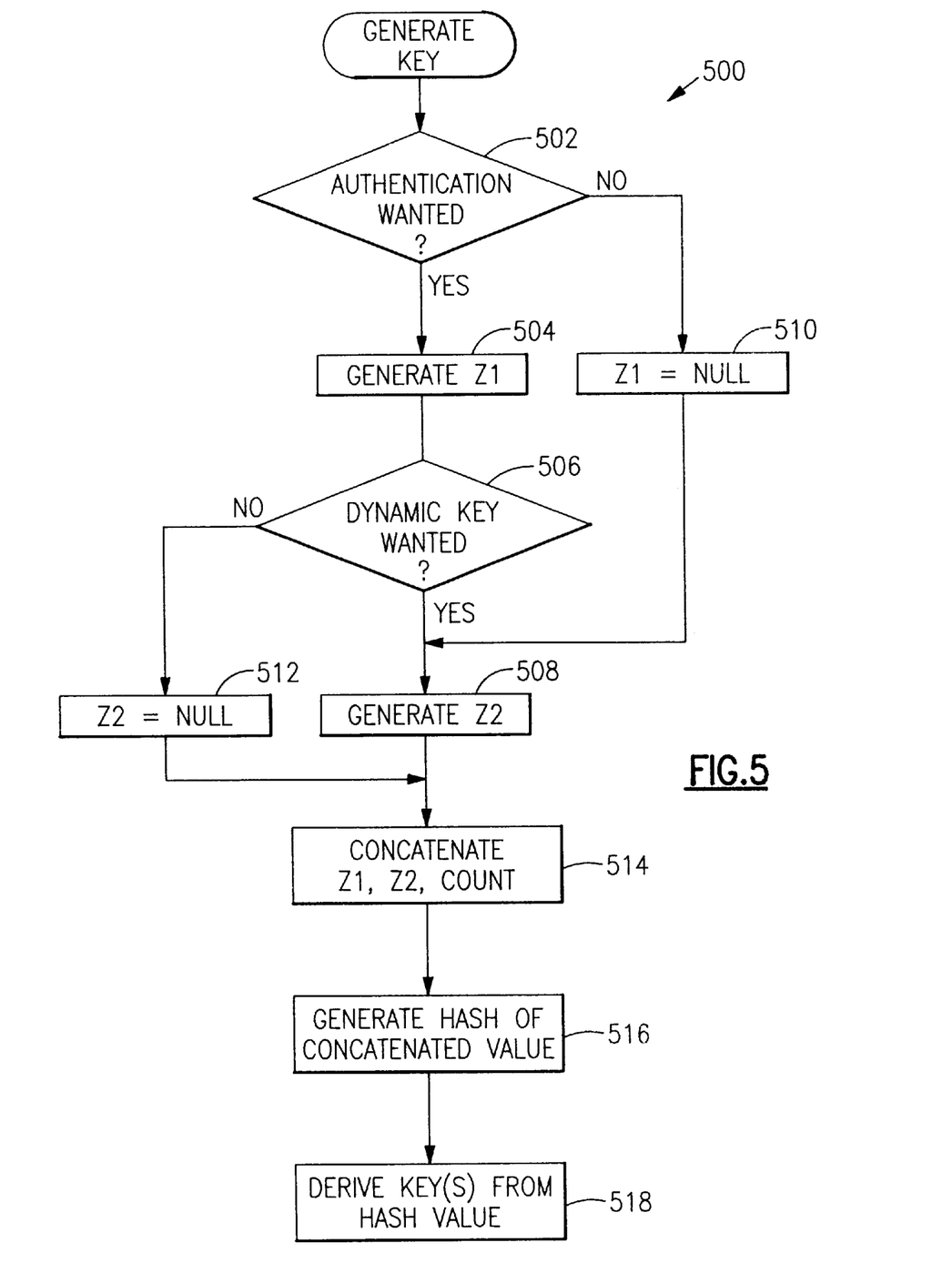
FIG. 5 is a flowchart of the overall procedure used by the key agreement system of FIG. 4.

FIG. 5 shows the overall procedure 500 used by the parties 402 and 404 to establish one or more key values that may be dynamically generated, authenticated, or both. Referring also to FIG. 4, if authentication is desired (step 502), then an authenticated static shared secret value Z1 is generated (step 504) using the procedure shown in FIG. 6; thus, user A generates an authenticated static value Z1a (410), while user B generates an identical authenticated static value Z1b (412). Otherwise, a zero-length null value is used for Z1 (step 510).

Figure 7:
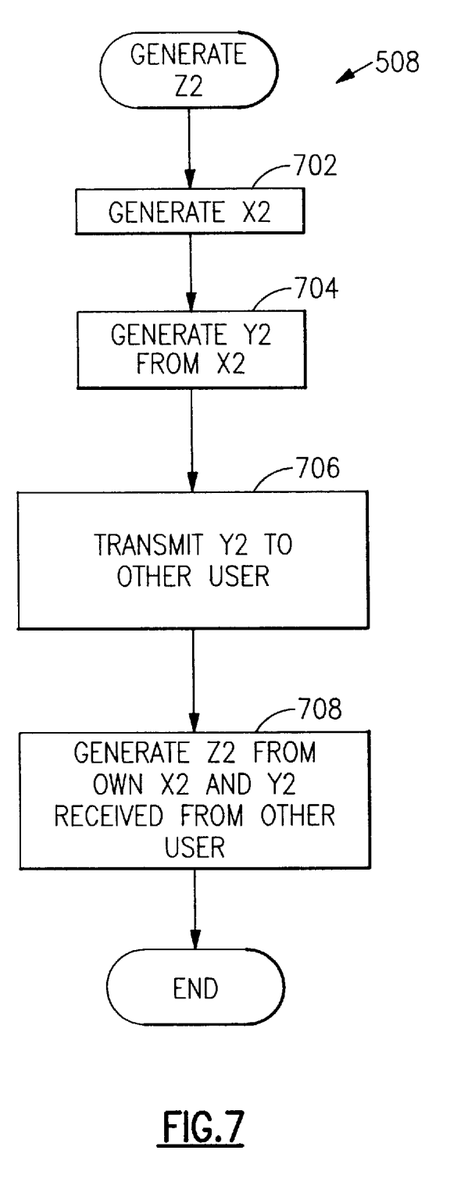
FIG. 7 is a flowchart of the procedure for generating a second shared secret value.

Similarly, if a dynamically generated value is desired (step 506), then a dynamic shared secret value Z2 is generated (step 508) using the procedure shown in FIG. 7; thus, user A generates a dynamic value Z2a (414), while user B generates an identical dynamic value Z2b (416). Otherwise, a zero-length null value is used for Z2 (step 512).

The shared secret values Z1 and Z2 (one of which may be of zero length) that are generated in this manner are then concatenated along with a key-specific value that includes a count (step 514) to generate a concatenated value. Thus, user A concatenates (418) Z1a (410), Z2a (414) and COUNTa (420) to generate a concatenated value Z1a ∥ Z2a ∥ COUNTa (422), while user B concatenates (424) Z1b (412), Z2b (416) and COUNTb (426) (=COUNTa) to generate an identical concatenated value Z1b ∥ Z2a ∥ COUNTa (428).

Finally, the concatenated value is passed through a one-way hash function to generate a hash value (step 516), and one or more keys are extracted from the resulting hash value (step 518). Thus, user A generates (430) a hash 432 as H(Z1a ∥ Z2a ∥ COUNTa), while user B generates (434) an identical hash 436 as H(Z1b ∥ Z2b ∥ COUNTb).

By "one-way" function is meant a function such as hash function H that is computationally infeasible to invert (i.e, generate an input producing a given output). As a hash function, H has the additional property that it is computationally infeasible to generate two inputs that produce the same output. Any suitable hash function such as SHA-1 may be used to realize the one-way function.

Figure 2:
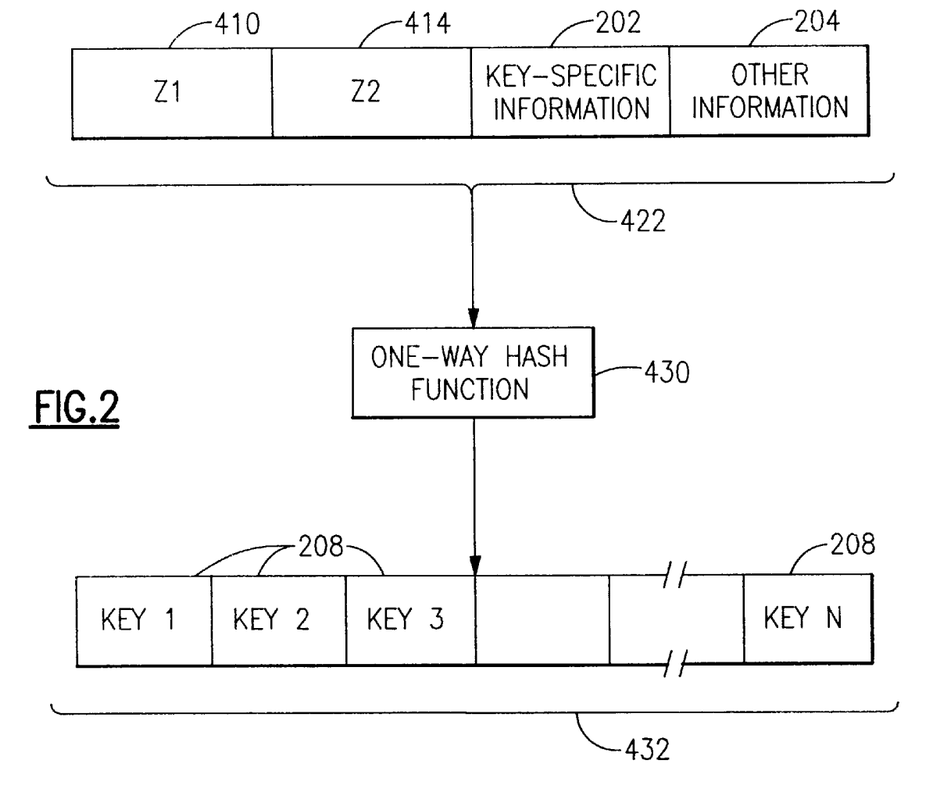
FIG. 2 is a schematic block diagram showing the derivation of key values from a pair of shared secret values in accordance with the present invention.
Figure 3:
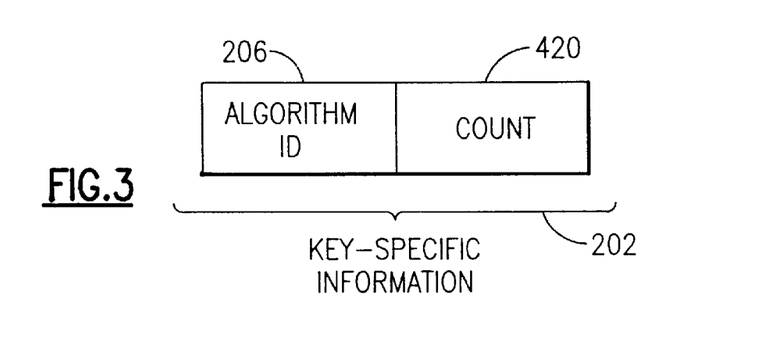
FIG. 3 is a schematic block diagram showing the makeup of the key-specific information that is concatenated with the shared secret values in FIG. 2.

FIGS. 2–3 show the concatenating, hashing, and key derivation steps in greater detail for a particular user. As shown in FIG. 2, the first shared secret value Z1 (410), the second shared secret value Z2 (414), key-specific information 202 and optionally other information 204 are concatenated to form the concatenated value 422 that is supplied as an input to the one-way hash function 430.

Key-specific information 202 comprises information that changes for each invocation of hash function 430. As shown in FIG. 3, this information 202 may comprise an algorithm ID 206, which identifies the cryptographic algorithm in which the generated keys are used, together with the count 420. (For simplicity, only the count is shown in FIG. 4.) Count 420 is incremented for each successive hash with the same input values Z1 and Z2, and is reset whenever Z1 or Z2 or the algorithm ID changes. The optional other information 204 may include public information contributed by the parties 102 and 104, public information mutually known to both parties, mutually known private information (such as an authentication key communicated over a separate channel or Z1 ∥ Z2), or the like.

The resulting hash value 432 (or the concatenation of hash values generated for successively incremented counts) is then partitioned into one or more keys 208 by extracting successive groups of bits, beginning at either the high-order (left) or low-order (right) end.

The keys that are generated are authenticated in the sense that only the parties to the original trusted exchange of Y1 values have the secret information (the retained X1 values) necessary to generate the correct value of Z1, one of the determinants of the key. Thus, even if user A exchanged Y2 values with a spoofer instead of with user B (and thus established a Z2 with the spoofer), the spoofer would be unable to generate the same key since it could not generate Z1. Therefore, the spoofer would be unable to monitor communications intended for user B.

Figure 6:
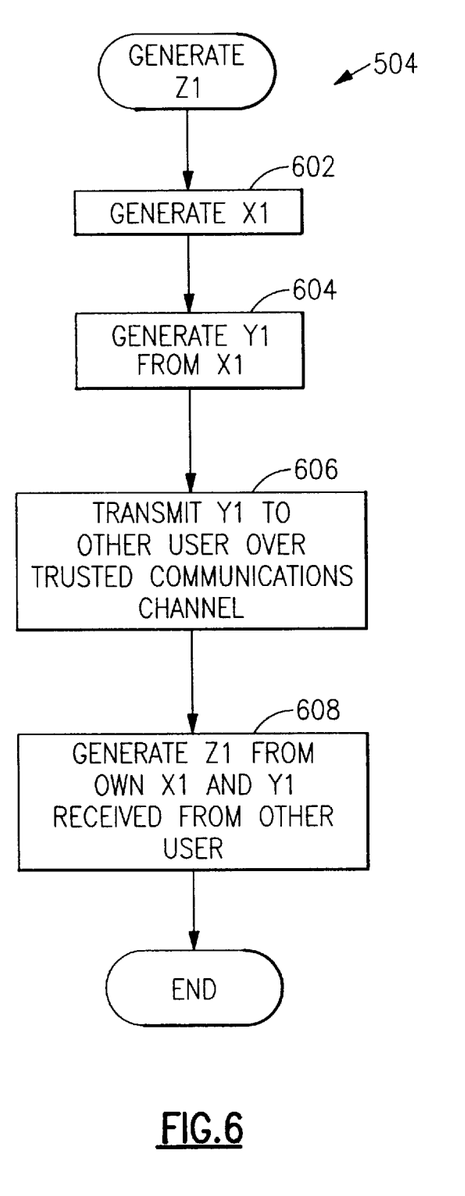
FIG. 6 is a flowchart of the procedure for generating a first shared secret value.

FIG. 6 shows the procedure 600 used by each party 102, 104 to generate an authenticated value Z1 (step 504). It is assumed that the parties have previously agreed on a prime modulus p and generator g. Preferably, $2^{(L-1)}<p<2^L$ for $512 \leq L \leq 4096$, where L is a multiple of 64. The prime modulus p should be of the form p=jq+1, where j is an integer$\geq 2$ and $q>2^{159}$. Any suitable mechanism may be used to establish the values g and p between the users 402 and 404.

Each party first generates a secret value X1 in any suitable manner such as pseudorandomly (step 602). Thus, referring to FIG. 4, user A generates (438) a secret value X1a (440), while user B generates (442) a secret value X1b (444). Preferably, $2^{159}>X\leq q-2$, where q is defined as above.

Each party then generates a public value Y1 from the secret value X1 as $$Y1 = g^{X1} \bmod p, \quad (4)$$

where p is the prime modulus and g is the generator over the Galois field GF(p) defined above (step 604). Thus, user A generates (446) a public value Y1a (448) as $$Y1a = g^{X1a} \bmod p, \quad (4a)$$

while user B generates (450) a public value Y1b (452) as $$Y1b = g^{X1b} \bmod p. \quad (4b)$$

Thereafter, each party 402, 404 transmits its own public value Y1 to the other party over the trusted communications channel 406, while keeping its value X1 secret (step 606). As noted above, by "trusted" is meant that each party is assured that the Y1 received actually originates from the other party and has not been altered; the communication need not be secret from third parties. Any suitable means (electronic communication, certificate authority, face-to-face meeting) may be used to effect the exchange.

Finally each party 402, 404 generates a value Z1 from the public value Y1 received from the other party and its own secret value X1 as $$Z1 = Y1^{X1} \bmod p, \quad (5)$$

where p is defined as before (step 608). Thus, user A generates (454) Z1a as $$Z1a = Y1b^{X1a} \bmod p, \quad (5a)$$

while user B generates (456) Z1b as $$Z1b = Y1a^{X1b} \bmod p, \quad (5b)$$

where p is defined as before. If each party has correctly generated its own Y1 value and has correctly communicated it to the other party, the Z1 values generated by the two parties should be equal.

Once calculated, the long-term Z1 values may be cached by the parties and used with a multiplicity of short-term values Z2. The long-term Z1 values need not be recalculated until such time as a different Z1 value may be desired.

FIG. 7 shows the procedure 700 used by each party 102, 104 to generate a short-term (or ephemeral) value Z2 (step 508). Procedure 700 is generally similar to procedure 600 for generating Z1. As with the procedure 600 shown in FIG. 6, it is assumed that the users have selected a prime modulus p and generator g, subject to the constraints mentioned above. The values p and g used in procedure 700 may the same as the values used in procedure 600, but need not be.

Each party first generates a secret value X2 in any suitable manner such as pseudorandomly, subject to the constraints mentioned above (step 702). Thus, referring to FIG. 4, user A generates (458) a secret value X2a (460), while user B generates (462) a secret value X2b (464).

Each party then generates a public value Y2 from the secret value X2 as $$Y2 = g^{X2} \bmod p, \quad (6)$$

where p is the prime modulus and g is the generator over the Galois field GF(p) defined for procedure 700 (step 704). Thus, user A generates (466) a public value Y2a (468) as $$Y2a = g^{X2a} \bmod p, \quad (6a)$$

while user B generates (470) a public value Y2b (472) as $$Y2b = g^{X2b} \bmod p. \quad (6b)$$

Thereafter, each party 402, 404 transmits its own public value Y2 to the other party over the normal communications channel 408, while keeping its value X2 secret (step 706). Optionally, the communications channel used for this exchange may be the trusted communications channel 406 used to exchange Y1. It is usually preferable, however to exchange the Y2 values over a higher-speed (but less "trusted") channel 408, since the authentication is being provided by Z1.

Finally, each party 102, 104 generates a value Z2 from the public value Y2 received from the other party and its own secret value X2 as $$Z2 = Y2^{X2} \bmod p, \quad (7)$$

where g and p are defined as before (step 708). Thus, user A generates (474) Z2a as $$Z2a = Y2b^{X2a} \bmod p, \quad (7a)$$

while user B generates (476) Z2b as $$Z2b = Y2a^{X2b} \bmod p, \quad (7b)$$

where p and g are defined as for step 704. If each party has correctly generated its own Y2 value and has correctly communicated it to the other party, the Z2 values generated by the two parties should be equal.

Combining the long-term authenticated shared secret Z1 with the short-term shared secret Z2 in accordance with the present invention allows one to obtain the advantages of authenticated keys as well as those of dynamically generated keys, while using existing Diffie-Hellman key agreement procedures. Since a spoofer cannot generate Z1, he cannot generate the keys that depend on Z1. Further, the system has perfect forward secrecy, since even if an attacker were to discover Z1, he could not generate a key without the dynamically generated Z2.

FIGS. 5–7 describe the operation of the present invention in an interactive environment. The invention may also be used in a non-interactive, store-and-forward environment (such as e-mail). In a store-and-forward environment, user A would set Z2 to null, since Z2 cannot be generated interactively. To prevent a replay attack, user A would include a nonce generated from time-stamp information as other information 204 used in the concatenation step 514. This nonce would then be sent to user B, along with the encrypted message and the public value Y1a (if the latter is not already publicly available), so that user B can create the session key and decrypt the message.

Various tests may be performed on Z1 and Z2 to minimize the likelihood of successful attacks. Thus, they may be checked to ensure that the number of 0s and 1s is approximately equal. Also, the Z values may be checked to verify that $Z^j \bmod p$ does not equal one, where $j=(p-1)/q$, since an attack is possible if $Z^j \bmod p=1$. Still other checks may be made if desired.

Various modifications of the present invention will be apparent to those skilled in the art. Also, various features of the present invention can be used without using other features. Thus, a shared secret value generated using the Diffie-Hellman procedure could be passed through a one-way function, irrespective of whether it is combined with a count or combined with another shared secret value. Similarly, two Diffie-Hellman shared secret values could be combined to generate a third shared secret value, irrespective of whether they are combined with a count or passed through a one-way function.

What is claimed is:

1. In a system in which each of a pair of users has its own nonshared secret value and establishes a shared secret value with the other user by transforming its own nonshared secret value using a common transformation to generate a transformed value, exchanging the transformed value with the other user, and generating the shared secret value from the user's own nonshared secret value and the transformed value received from the other user, a method of establishing for one of said users a new shared secret value with the other of said users, comprising the steps of:

generating a first shared secret value from a first nonshared secret value generated by said one of said users and a first transformed value received from the other of said users, said first transformed value being generated by said other of said users from its own first nonshared secret value and being authenticated as having originated from said other of said users;

generating a second shared secret value from a second nonshared secret value generated by said one of said users and a second transformed value received from the other of said users, said second transformed value being generated by said other of said users from its own second nonshared secret value and not being authenticated as having originated from said other of said users; and generating said new shared secret value as a function of said first shared secret value and said second shared secret value.

2. The method of claim 1 wherein said users are located at nodes coupled by a communications channel.

3. The method of claim 1 wherein each of said users performs said steps.

4. The method of claim 1 wherein each of said steps of generating a shared secret value comprises the steps of:

generating a transformed value by transforming in a manner infeasible to invert, using said common transformation a nonshared secret value generated by said one of said users;

transmitting said transformed value to the other of said users;

receiving a transformed value generated by the other of said users using said common transformation; and generating, from said nonshared secret value generated by said one of said users and said transformed value received from said other of said users, a shared secret value that is infeasible to generate solely from the transformed values exchanged between said users.

5. The method of claim 4 wherein said transformed value is generated by said one of said users as $$Y = g^X \bmod p$$

where X is the nonshared secret value generated by said one of said users, Y is the transformed value generated by said one of said users, p is a prime modulus, and g is a generator over the Galois field GF(p).

6. The method of claim 5 wherein said shared secret value is generated by said one of said users as $$Z = Y^X \bmod p$$

where X is the nonshared secret value generated by said one of said users, Y is the transformed value received from said other of said users, p is said prime modulus, and Z is said shared secret value.

7. The method of claim 1 wherein said step of generating said new shared secret value comprises the steps of:
   combining said first and second shared secret values to generate a combined value; and
   generating said new shared secret value as a one-way function of said combined value.

8. The method of claim 7 wherein said first and second values are also combined with a count to generate said combined value.

9. The method of claim 1 wherein said first shared secret value is a relatively long-term value and said second shared secret value is a relatively short-term value.

10. The method of claim 1 wherein said first transformed value is received from said other of said users over a trusted communications channel.

11. In a system in which each of a pair of users has its own nonshared secret value and establishes a shared secret value with the other user by transforming its own nonshared secret value using a common transformation to generate a transformed value, exchanging the transformed value with the other user, and generating the shared secret value from the user's own nonshared secret value and the transformed value received from the other user, a method of establishing for one of said users a new shared secret value with the other of said users, comprising the steps of:
   generating a first shared secret value from a first nonshared secret value generated by said one of said users and a first transformed value received from the other of said users, said first transformed value being generated by said other of said users from its own first nonshared secret value;
   generating a second shared secret value from a second nonshared secret value generated by said one of said users and a second transformed value received from the other of said users, said second transformed value being generated by said other of said users from its own second nonshared secret value;
   concatenating said first and second shared secret values to generate a concatenated value; and
   generating said new authenticated shared secret value as a one-way function of said concatenated value.

12. A method of establishing for one of a pair of users a cryptographic key that is shared with the other of said pair of users, comprising the steps of:
   generating a transformed value by transforming in a manner infeasible to invert, using a common transformation, a nonshared secret value generated by said one of said users, each of said users having its own nonshared secret value;
   transmitting said transformed value to the other of said users;
   receiving a transformed value generated by the other of said users from its own nonshared secret value using said common transformation;
   generating, from said nonshared secret value generated by said one of said users and said transformed value received from said other of said users, a shared secret value that is infeasible to generate solely from the first transformed values exchanged between said users;
   concatenating said shared secret value and a value available to the other user to generate a concatenation value; and
   generating said key as a one-way function of said concatenation value.

13. A program storage device readable by a machine, tangibly embodying a program of instructions executable by the machine to perform the method steps of claim 1, claim 11 or claim 12.

14. The method of claim 12 in which said value available to the other user is a successively incremented count.

15. The method of claim 12 wherein said step of generating said key comprises the step of generating each of a plurality of different keys as a one-way function of said shared secret value and a value available to the other user that is unique to that key.

16. The method of claim 12 wherein said users are located at nodes coupled by a communications channel.

17. The method of claim 12 wherein each of said users performs said steps.

18. In a system in which each of a pair of users has its own nonshared secret value and establishes a shared secret value with the other user by transforming its own nonshared secret value using a common transformation to generate a transformed value, exchanging the transformed value with the other user, and generating the shared secret value from the user's own nonshared secret value and the transformed value received from the other user, apparatus for establishing for one of said users a new shared secret value with the other of said users, comprising:
   means for generating a first shared secret value from a first nonshared secret value generated by said one of said users and a first transformed value received from the other of said users, said first transformed value being generated by said other of said users from its own first nonshared secret value and being authenticated as having originated from said other of said users;
   means for generating a second shared secret value from a second nonshared secret value generated by said one of said users and a second transformed value received from the other of said users, said second transformed value being generated by said other of said users from its own second nonshared secret value and not being authenticated as having originated from said other of said users; and
   means for generating said new authenticated shared secret value as a function of said first shared secret value and said second shared secret value.

19. The apparatus of claim 18 wherein each of said means for generating a shared secret value comprises:
   means for generating a transformed value by transforming in a manner infeasible to invert, using said common transformation, a nonshared secret value generated by said one of said users;

means for transmitting said transformed value to the other of said users;

means for receiving a transformed value generated by the other of said users using said common transformation; and means for generating, from said nonshared secret value generated by said one of said users and said transformed value received from said other of said users, a shared secret value that is infeasible to generate solely from the transformed values exchanged between said users.

20. The apparatus of claim 18 wherein said means for generating said new shared secret value comprises:

means for combining said first and second shared secret values to generate a combined value; and means for generating said new shared secret value as a one-way function of said combined value.

21. In a system in which each of a pair of users has its own nonshared secret value and establishes a shared secret value with the other user by transforming its own nonshared secret value using a common transformation to generate a transformed value, exchanging the transformed value with the other user, and generating the shared secret value from the user's own nonshared secret value and the transformed value received from the other user, apparatus for establishing for one of said users a new shared secret value with the other of said users, comprising:

means for generating a first shared secret value from a first nonshared secret value generated by said one of said users and a first transformed value received from the other of said users, said first transformed value being generated by said other of said users from its own first nonshared secret value;

means for generating a second shared secret value from a second nonshared secret value generated by said one of said users and a second transformed value received from the other of said users, said second transformed value being generated by said other of said users from its own second nonshared secret value;

means for concatenating said first and second shared secret values to generate a concatenated value; and means for generating said new authenticated shared secret value as a one-way function of said concatenated value.

22. Apparatus for establishing for one of a pair of users a cryptographic key that is shared with the other of said pair of users, comprising:

means for generating a transformed value by transforming in a manner infeasible to invert, using a common transformation, a nonshared secret value generated by said one of said users, each of said users having its own nonshared secret value;

means for transmitting said transformed value to the other of said users;

means for receiving a transformed value generated by the other of said users from its own nonshared secret value using said common transformation;

means for generating, from said nonshared secret value generated by said one of said users and said transformed value received from said other of said users, a shared secret value that is infeasible to generate solely from the first transformed values exchanged between said users;

means for concatenating said shared secret value and a value available to the other user to generate a concatenation value; and means for generating said key as a one-way function of said concatenation value.

23. The apparatus of claim 22 in which said value available to the other user is a successively incremented count.

24. The apparatus of claim 22, wherein said means for generating said key generates each of a plurality of different keys as a one-way function of said shared secret value and a value available to the other user that is unique to that key.

* * * * *